Sept. 8, 1970 J. MAURICE 3,527,328

FLUID OPERATED CLUTCH WITH MODULATED SPEED RESPONSIVE ENGAGEMENT

Filed Nov. 25, 1968 3 Sheets-Sheet 1

INVENTOR

JEAN MAURICE

By Young + Thompson

ATTYS

INVENTOR
JEAN MAURICE
BY Young + Thompson
ATTYS.

Sept. 8, 1970 J. MAURICE 3,527,328

FLUID OPERATED CLUTCH WITH MODULATED SPEED RESPONSIVE ENGAGEMENT

Filed Nov. 25, 1968 3 Sheets-Sheet 3

INVENTOR

JEAN MAURICE

By Young + Thompson

ATTYS.

United States Patent Office 3,527,328

Patented Sept. 8, 1970

3,527,328

FLUID OPERATED CLUTCH WITH MODULATED SPEED RESPONSIVE ENGAGEMENT

Jean Maurice, Paris, France, assignor to Societe Anonyme Francaise du Ferodo, Paris, France Filed Nov. 25, 1968, Ser. No. 778,702
Claims priority, application France, Dec. 1, 1967, 130,544
Int. Cl. F16d *25/00*
U.S. Cl. 192—86 9 Claims

ABSTRACT OF THE DISCLOSURE

A transmission, especially for automobile vehicles, comprising at least one clutch having members adapted to be coupled by clamping together friction surfaces, and in which one part is a driving portion associated with an engine having a variable speed of rotation including an idling speed, while another part is a driven portion, said members being clamped together axially by an increase in volume of a hydraulic actuating chamber and by a reduction in volume of a hydraulic drainage chamber and being axially released by the reverse operation, conduits respectively connected to the two said chambers, distributor means associated with a source of fluid pressure and with a tank, the position of the distributor means effecting either the application of pressure to the conduit of the actuating chamber and the coupling to the tank of the conduit of the drainage chamber for the purpose of engaging the clutch, or the connection to the tank of the actuating chamber and the application of pressure to the conduit of the drainage chamber for the purpose of disengaging the clutch, the transmission comprising means for reducing the pressure in the actuating chamber of the clutch, means for throttling the return to the tank from the drainage chamber of the clutch, a control slide-valve actuated in dependence on the speed of rotation of the engine and co-operating with both of the two said means so that when the engine rotates at idling speed it occupies a first position in which it renders the two said means operative, and when the engine rotates faster than idling speed, the slide-valve occupies a second position in which the two said means are inoperative.

The present invention relates to a transmission, especially for an automobile vehicle, comprising at least one clutch having members adapted to be coupled by clamping together friction surfaces and in which one part is a driving member associated with an engine having a variable speed of rotation, including an idling speed, while another part is a driven member, the said members being clamped together axially by an increase in volume of a hydraulic actuating chamber and by a reduction in volume of a hydraulic drainage chamber and being freed axially by the reverse operation, conduits connected respectively to the two chambers, distributor means associated with a source of fluid pressure and with a tank, the said distributor means ensuring, depending on its position, either the application of pressure to the conduit of the actuating chamber and a connection to the tank of the conduit of the drainage chamber, for the purpose of disengaging the clutch or the connection to the tank of the actuating chamber conduit and the application of pressure to the drainage chamber conduit in order to disengage the clutch.

The present invention relates more particularly to a transmission of this kind, in which the driving part of the clutch is driven from an engine through the intermediary of a coupling device, the transmissible torque of which varies in dependence on the speed of rotation of the engine, for example a centrifugal device or a hydro-kinetic device such as a torque converter or coupler, this device comprising at least one member which, during the disengagement of the clutch, is capable of having a free inertia, the driven portion of the clutch being coupled to a driven shaft which, in the case of an automobile vehicle, is coupled for example through the intermediary of a gear-box, to the driving wheels of the vehicle.

If certain precautions are not taken, the free inertia possessed by one of the members of the centrifugal or hydro-kinetic coupling device which actuates the driving part of the clutch is liable to produce a shock with the vehicle stationary and the engine running at idling speed when a gear is engaged for the purpose of moving-off.

In order to prevent this shock, it is possible to reduce the value of the pressure which is sent into the actuating chamber of the clutch as long as the engine runs at idling speed. It is for example then possible to reduce this pressure to zero if, in order to profit by the advantages of an engagement of the clutch in the absence of oil pressure, a clamping system has been provided by elastic means of moderate strength, acting in the direction of engagement, these means being then in operation alone. The pressure admitted to the actuating chamber of the clutch may also be given a reduced value, which is a fraction of the normal value applied when the engine is rotating faster than idling speed.

However, this palliative is not wholly satisfactory, either because the elastic means such as those mentioned above are too strong to avoid all shocks completely, for example if they have been chosen so as to be sufficient to permit the starting of the engine, or because the idling speed of the engine has a value such that the free inertia of the member is too strong at the idling speed to be overcome by a simple reduction of the hydraulic pressure of engagement of the clutch.

In order to prevent this shock, it is also possible to give a greater degree of progressivity to the engagement of the clutch, for example by throttling or restricting to a certain degree the return path to the tank by which the oil leaves the drainage chamber of the clutch by the action of the presure acting in the direction of engagement, but this throttling effect introduces a delay which subsists when the conditions of idling speed no longer exist. If the delaying effect is chosen fairly small so that it has certainly ceased at the moment when an immediate acceleration follows the idling speed, it is not sufficient to prevent the shock. If it is chosen fairly large so as to avoid this shock, it introduces excessive slip of the clutch during the moment of acceleration, and this adversely affects the performance of the clutch.

The applicant has found that good results can be obtained by associating the actions, on the one hand of a reduction of the pressure forces developed in the actuating chamber in the direction of engagement, and on the other hand, of a throttling effect produced on the return path from the drainage chamber of the clutch, this reduction and throttling effect being put into action simultaneously when the engine rotates at idling speed, and being eliminated and/or modified as soon as the engine rotates faster than its idling speed.

The present invention has for its object a transmission, especially for automobile vehicles, which has been improved in the respects which have been explained above, and which is in particular free from shocks while stationary.

A transmission according to the invention is especially characterized in that it comprises means for reducing the pressure in the actuating chamber of the clutch, means for throttling the return to the tank from the drainage chamber of the clutch, a slide-valve which is controlled in dependence on the speed of rotation of the engine and which co-operates with both of the two said means in such manner as, when the engine is rotating at idling speed, to occupy a first position in which it renders the two said means operative and, when the engine rotates faster than idling speed, to take-up a second position in which it renders the two said means inoperative.

By virtue of this arrangement, in which the effects of reduction of pressure and throttling of the return are combined, there is obtained the result that all shocks are entirely eliminated, at the same time preventing slipping of the clutch at the moment of starting-off.

It will also be appreciated that a device comprising a slide-valve acting simultaneously on a pressure-reducing means and on a return-throttling means can be produced in the form of a circuit unit of simple and effective construction.

In accordance with another characteristic, the source of pressure is a pump driven at a speed equal or proportional to that of the engine so as to deliver a lower pressure when the engine rotates at idling speed than when the engine rotates faster than idling speed, the said slide-valve being subjected to the pressure of the said pump and being displaceable in response to the variations of the said pressure.

In accordance with a further characteristic feature, the pressure-reducing means consists of a small leakage passage which is associated with the slide-valve and which is interposed between the actuating chamber and the tank, the said slide-valve opening the said leakage passage in the first position and closing the said passage in the second position.

Following a further characteristic feature, the throttle means consists of a small hole which is interposed on the return to the tank of the drainage chamber, in parallel with a large return conduit which is closed by the slide-valve in the first position so as to render the small hole alone able to evacuate the drainage chamber, while the said wide conduit is opened by the slide-valve in the second position so as to permit a large evacuation which renders the small hole of no effect.

The small hole is preferably associated with a calibrated valve arranged so as to open a wide passage to the return to the tank of the drainage chamber when the clutch members carry out an approaching movement prior to engagement, and to close subsequently this wide passage, leaving the small hole alone operative for the evacuation of the drainage chamber when once the said approach movement has ceased and the engagement has taken place.

In one form of construction, the transmission comprises a single clutch, the distributor means having two positions corresponding respectively to the engagement and disengagement of the clutch, the slide-valve being put out of action in the position of disengagement of the said distributor means.

In an alternative form, the transmission comprises two clutches, the actuating chamber of one forming the drainage chamber of the other and vice-versa, the driving parts of the two clutches being rigidly fixed to each other, the clutches having separate driven parts, the distributor means having three positions corresponding respectively to one neutral position in which the two clutches are disengaged and to two positions of engagement of either one or the other of the clutches, the remaining clutch being disengaged, the slide-valve being put out of operation in the neutral position of the distributor means.

The objects, characteristic features and advantages of the invention will be further brought out in the description which follows below of one form of construction chosen by way of example, reference being made to the accompanying drawings, in which.

Figure 1:
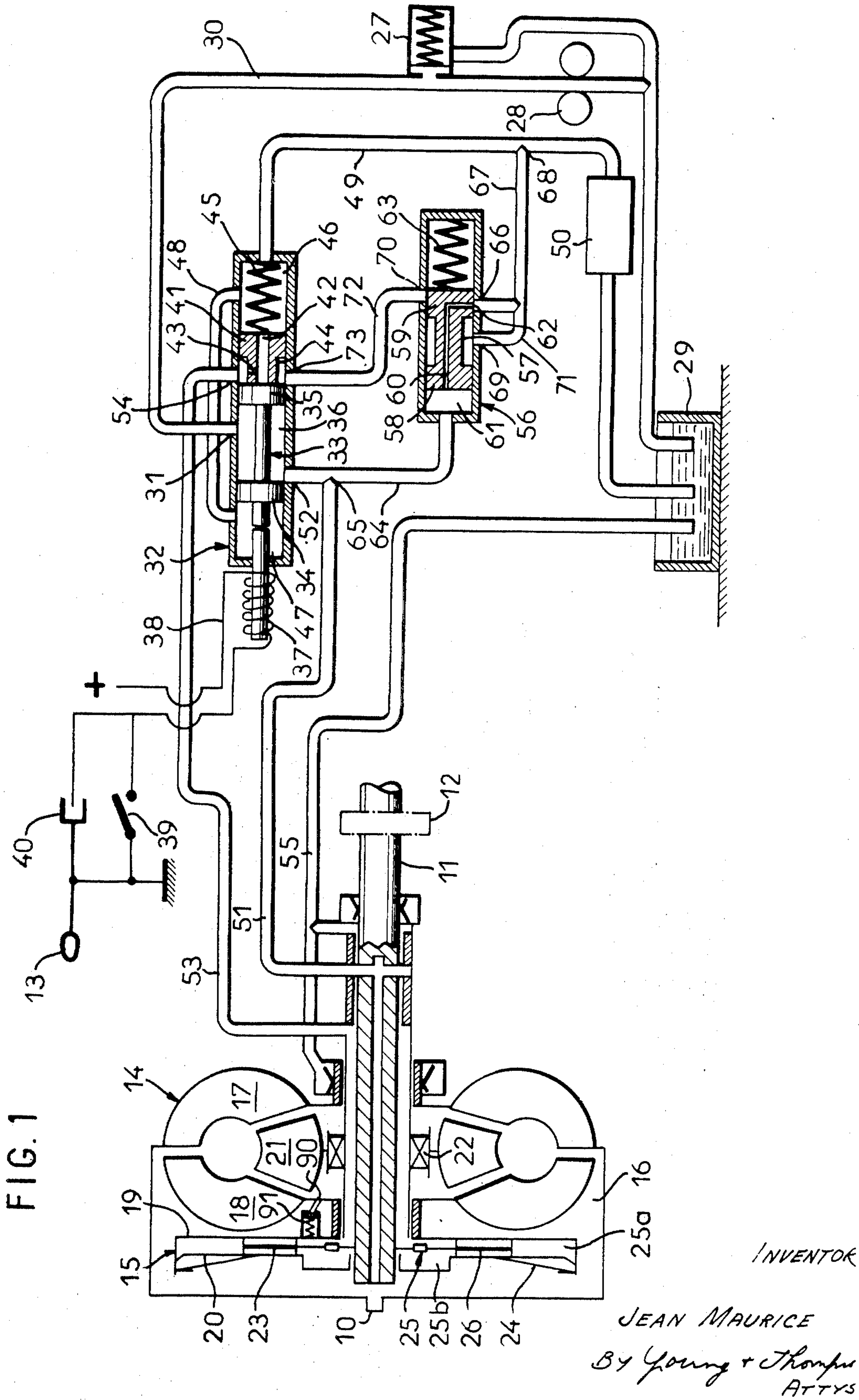
FIG. 1 shows diagrammatically a transmission for an automobile vehicle according to the invention, comprising a single clutch, the said clutch being engaged while the engine rotates at idling speed.

Reference will first be made to FIGS. 1 to 4.

In the form of embodiment shown in these figures, which concern by way of example an application of the invention to a transmission for an automobile vehicle, this transmission comprises, between a driving shaft 10 and a driven shaft 11, on the one hand a hydraulic torque converter 14 and on the other hand a single clutch 15, which are arranged inside a chamber 16, filled with oil and rigidly fixed on the shaft 10.

The driven shaft 11 forms the input shaft of a gearbox 12, the selecting lever of which can be seen at 13.

The hydraulic torque converter 14 comprises an impeller 17 coupled to the shaft 10, a turbine 18 coupled to a pair of plates 19 and 20 of the clutch 15, and a reactor 21 associated with a free-wheel 22. The turbine 18 constitutes a member of the coupling device 14 capable of possessing a free inertia when the engine is running at idling speed, the clutch 15 being disengaged or engaged while the gear-box 12 is in its neutral position.

The plates 19 and 20 of the clutch 15 are adapted to clamp between them a friction disc 23 coupled to the shaft 11, and are urged by an elastic means constituted for example by a Belleville washer 24 which tends to force them together with a small force.

The plates 19 and 20 form a cylinder-piston system immersed in the oil of the chamber 16, which constitutes for them an external chamber known as the actuating chamber, and they define between each other an internal chamber 25 known as the drainage chamber. This latter comprises the disc 23 and has a peripheral region **25*a* surrounding the linings of the disc 23 and a central region 25*b* surrounded by the said linings. The two regions 25*a* and 25*b* communicate with each other by controlled passage means 26** formed in the disc (not shown in detail).

A small orifice 90 which generates a loss of pressure is formed in one of the plates 19 or 20 between the circuit of the converter 14 or the chamber 16 and the chamber **25*b*, and comprises a non-return valve 91 so as to permit a circulation in the direction 16, 25*b*** and to prevent any circulation in the opposite direction.

The outer faces of the friction linings of the disc 23 are preferably not parallel, in the free state, to the corresponding faces of the plates 19 and 20. During an approach phase of the plates 19 and 20 towards the disc 23, the chambers **25*a* and 25*b* communicate freely with each other. During a phase of engagement proper which follows this approach phase, the disc 23 is elastically deformable and maintains a barrier between the chambers 25*a* and 25*b*, compelling the fluid to pass through the narrow passage 26**.

The clutch 15 is actuated as a function of the pressures which are allowed to exist respectively in the actuating chamber 16 and in the drainage chamber 25.

The clutch 15 is engaged by increasing the volume of the chamber 16 and reducing the volume of the chamber 25, that is to say when the pressure in the chamber 16 is high while the chamber 25 is connected to discharge. The clutch 15 is disengaged by increasing the volume of the chamber 25 and reducing the volume of the chamber 16, that is to say when the pressure in the chamber 25 is high while the chamber 16 is connected to the discharge.

The action of the elastic washer 24 which, for example is sufficient to drive the engine by the vehicle while overcoming the engine compression, by the action of the turbine 18, is such that it is largely overcome by the application of pressure to the chamber 25 for the purpose of disengaging the clutch.

In the example of FIG. 1, the level of pressure in the chamber 16 for the engagement, and that admitted to the chamber 25 for the disengagement are the same, and are determined by means of a calibrated discharge valve 27 which is associated with a pump 28. This latter draws from a tank 29 and is driven at a speed of rotation which is equal or proportional to that of the driving shaft 10, so as to deliver a lower pressure when the engine rotates at idling speed than when the engine rotates faster than its idling speed.

The delivery conduit 30 of the pump 28 is connected at 31, on the downstream side of the discharge valve 27, to a distributor 32 which comprises a slide-valve 33 having two bearing surfaces 34 and 35 forming between them a pressure space 36 communicating continuously with the orifice 31.

The slide-valve 33 is actuated, at the side of the bearing surface 34, by an electro-magnet 37, the electric circuit 38 of which has two switches in parallel, one 39 responsive to the fact that the gear-box 12 is in neutral, the other being responsive to the fact that the selecting lever 13 is actuated to change the ratio of the gear-box 12.

After the bearing surface 35 of the slide-valve 33 is slidably mounted a small piston 41 forming a clapper and having a large axial orifice 42 and a small calibrated lateral orifice 43, which is formed on a part 44 of smaller diameter forming a tail adjacent to the slide-valve 33. In the present example, the orifice 43 is chosen with a section smaller than that of the passage 26. A spring 45 acts on the small piston 41 in the direction opposite to the actuation direction of the electro-magnet 37.

To the right of the piston 41 and on the left of the bearing surface 34, there are respectively formed in the distributor 32, two spaces 46 and 47 which are permanently connected to each other by a conduit 48 and which communicate with a return conduit 49 which may comprise, as in the example shown, a heat exchanger 50, and is connected to the tank 29.

The actuating chamber 16 of the clutch 15 is connected by a conduit 51 to an orifice 52 of the distributor 32, while the drainage chamber 25 of the clutch 15 is connected by a conduit 53 to an orifice 54 of the distributor 32. There can be seen at 55 a leakage-collecting conduit for the device 14 which is connected to the tank 29.

A control device 56 has a cylindrical body receiving a slidably mounted slide-valve 57 which comprises two bearing surfaces 58 and 59, and which is traversed by an elbowed calibrated bore 60. This bore 60 communicates with the space 61 which is arranged to the left of the bearing surfaces 58 and open laterally at 62 along the bearing surface 59. A spring 63 acts on the slide-valve 57 in the direction which tends to reduce the volume of the chamber 61. The chamber 61 is connected to a conduit 64 which is branched at 65 to the conduit 51, connected to the orifice 52 of the distributor 32.

The body 56 comprises an orifice 66 which is intended to co-operate with the opening 62 of the bore 60 and which is coupled to a conduit 67 branched at 68 on the return conduit 49 to the tank 29. Two other orifices 69 and 70 are also provided on the body 56. The orifice 69 is connected by a conduit 71 to the return conduit 67. The orifice 70 is connected by a conduit 72 to an orifice 73 which is formed in the distributor 32, facing the orifice 54.

Figures 2, 3, 4:
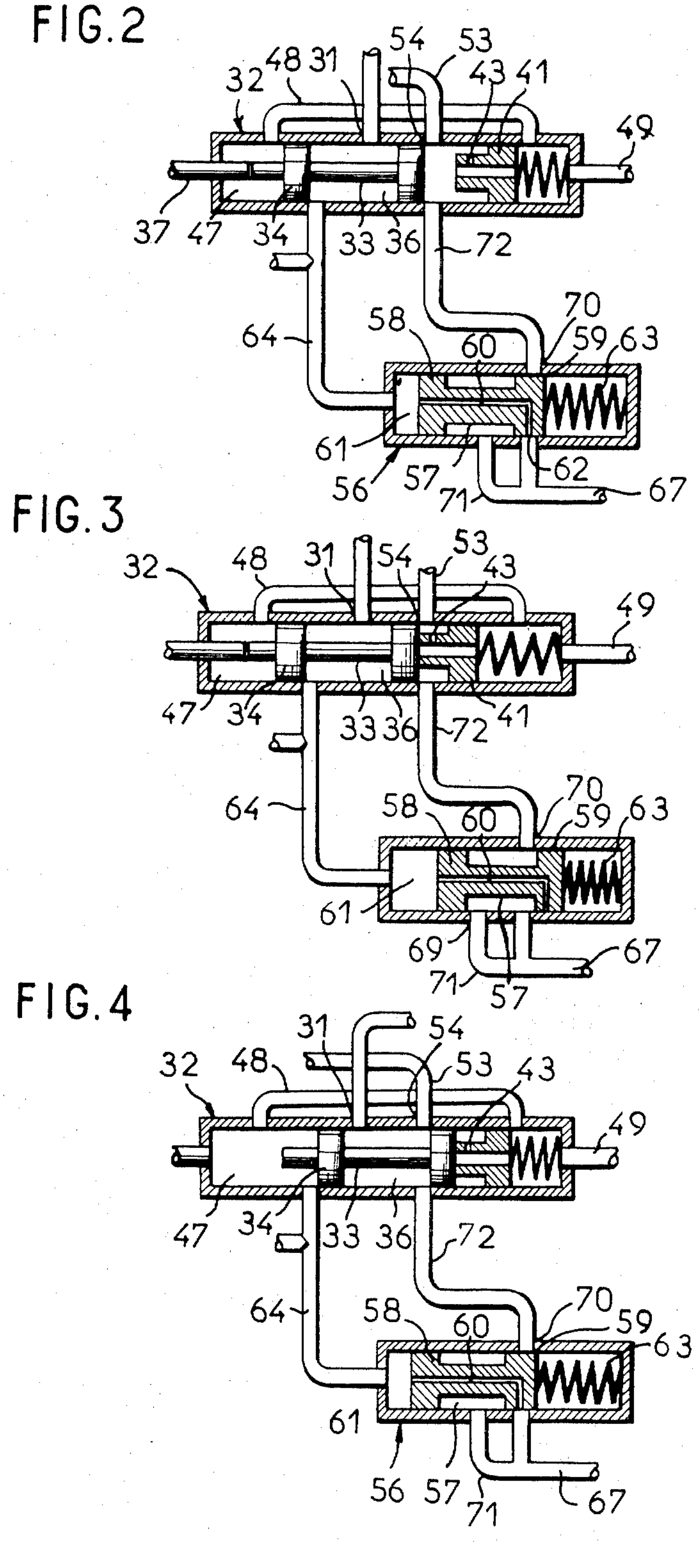
FIG. 2 is a partial view in a position at which the clamping members of the clutch are permitted to come together rapidly before engagement of the clutch.
FIG. 3 is a view similar to FIG. 2, but in a position at which the clutch is engaged while the engine is rotating at a speed higher than the idling speed.
FIG. 4 is a view similar to FIG. 2 or FIG. 3, but in a position at which the clutch is disengaged.

The slide-valve 33 of the distributor 32 is movably mounted between a so-called "engaged" position such as shown in FIGS. 1, 2 and 3, and for which the electro-magnet 37 is de-energized (the gear-box 12 is not at neutral and the lever 13 has not been touched), and a "disengaged" position which is displaced towards the right with respect to that previously mentioned, and which is shown in FIG. 4, for which the electro-magnet 37 is energized (the gear-box 12 is in neutral and/or the lever 13 is grasped in order to engage a gear or to change gears).

It will be noted that in the engaged postiion of FIGS. 1 to 3, the pressure space 36 communicates with the conduits 51 and 64, while the conduit 53 communicates with the return conduits 49 and 72. In the disengaged position (FIG. 4) the pressure space 36 communicates with the conduit 53 while the conduit 51 communicates with the conduit 48 which returns to the tank.

The small piston 41 is either in a position applied against the slide-valve 33 (FIGS. 1, 3 and 4), or in a position away from this slide-valve 33 (see FIG. 2).

The slide-valve 57 of the control device 56 is movably mounted between two positions: a first position known as the active position of pressure reduction and throttling (FIGS. 1, 2 and 4), in which the opening 62 of the calibrated bore 60 communicates with the return conduit 67, and in which the bearing surface 59 closes the orifice 70; and a second position known as the inactive position (FIG. 3), in which the opening 62 is throttled and in which the orifice 70 communicates with the return conduits 71 and 67.

The operation is as follows:

When the vehicle is running, the engine rotating with a gear engaged, and when the user does not touch the lever 13, the slide-valve 33 is in the engaged position of FIGS. 1 to 3. The pump 28 driven by the engine and supplying the pressure space 36 and the conduits 51 and 64, develops in the chamber 61 a pressure sufficient for the slide-valve 57 to be pushed back towards the right against the action of the spring 63. This represents the position shown in FIG. 3.

The pressure developed at 36 and regulated by the clapper-valve 27 is not reduced at 61 due to the throttling at 62 of the passage 60. In addition, the conduit 53 communicates with the tank without substantial loss of pressure over the path 53, 72, 70, 69, 67, 29. The clutch 15 is held engaged without risk of slipping, irrespective of the speed of the engine, by the effect of the pressure at 51 on which is superposed the moderate force of the elastic washer 24.

Under these conditions, when the user operates the lever 13 in order to change the ratio of the gear-box 12, the slide-valve 33 passes from the engaged position of FIG. 3 to the disengaged position shown in FIG. 4. The device 56 returns to the position of FIG. 1. The clapper-valve 27 still maintains the regulated pressure in the space 36, but this time the pressure is sent through the conduit 53 into the chamber 25 of the clutch, which disengages the latter and permits the engagement of the new gear ratio. The slide-valve 57 is put out of operation in the position shown in FIG. 4, since the conduit 64 is not subject to the pressure of the pump 28 and is connected to the tank by 47, 48 and 49.

When the new gear is engaged, the user releases the lever 13, the slide-valve 33 again moves into the position of FIG. 3, which engages the clutch. This engagement is effected rapidly since on the one hand the pressure is sent in its entirety into the chamber 16 and since on the other hand the chamber 25 can be emptied without loss of pressure (FIG. 3) through the conduits 53, 72 and 67 to the tank 29; since the device 56 is returned by the pressure 61 to the position of FIG. 3.

The device 58 practically does not modify the conditions of operation of the clapper-valve 27 when the vehicle is running, but it acts to improve the conditions of operation when the vehicle is stopped, the engine is rotating at idling speed, and the user engages a gear so as to move-away.

At the idling speed of the engine, the delivery of the pump 28 is relatively small and the pressure in the space 36 is fairly low, since the slide-valve 57 is in the left-hand position (FIG. 1 or 2), since the oil can escape towards the tank 29 by 61, 60 and 67. The pressure does not however fall completely to zero at 36 by reason of the narrowness of the passage 60 forming a pressure-drop, but it reaches a very small value. At the same time, the bearing surface 59 of the slide-valve 57 throttles the orifice 70.

The low pressure at 36 and the reduced action of the elastic washer 24 tend to bring the plate 19 closer towards the plate 20. As long as the disc 23 is not touched on either side by the plates 19 and 20, the oil driven from the chamber 25 into the conduit 53 has sufficient pressure, when it is discharged at 54 into the distributor 32, to push back the piston 41 against the action of the spring 45 (FIG. 2) and it can be rapidly evacuated to the tank 29 over the path 54, 42, 46 and 49.

This permits a rapid approach of the plates 19 and 20 into contact with the disc 23.

When this contact takes place, the oil can no longer pass from **25*a* to 25*b* except through the narrow passage 26, while the continuation of the engagement can only be effected by means of a compression and/or an elastic deformation of the disc 23. Taking into account the reaction of the axially-fixed plate 19, the pressure developed on the axially-movable plate 20 is only partially transmitted into the chamber 25 and the oil which can be driven from the chamber 25 into the conduit 53 only has a fraction of the pressure which it had before coming into contact with the disc 23. This fractional pressure is no longer sufficient to overcome the spring 45, chosen accordingly, and the piston 41 is applied against the slide-valve 33. The oil passing out at 54 must pass through the narrow calibrated orifice 43 in order to return to the tank 29** (FIG. 1).

Under these conditions, during the engagement phase at idling speed, the clutch has a reduced transmissible torque for two reasons: the first being that the pressure acting at 16 is reduced because of the leakage at 60, the washer 24 itself not being very strong; the second being that the oil is braked at its departure from the chamber 25 towards the tank because of the small orifice 45 which forms a kind of throttle on the return.

An engagement of this kind with a reduced torque prevents any shock when stationary.

When accelerating so as to move away (FIG. 3), the reduction of the thrust pressure and the throttling of the return cease simultaneously, thus preventing any slip of the clutch.

It will be appreciated that the modification according to the invention gives good results, not only at normal idling speed but also on idling speed with the choke, since in this later case the engine is cold and the oil is more viscous, which compensates for the effect of the greater number of revolutions.

Figures 5, 6, 7:
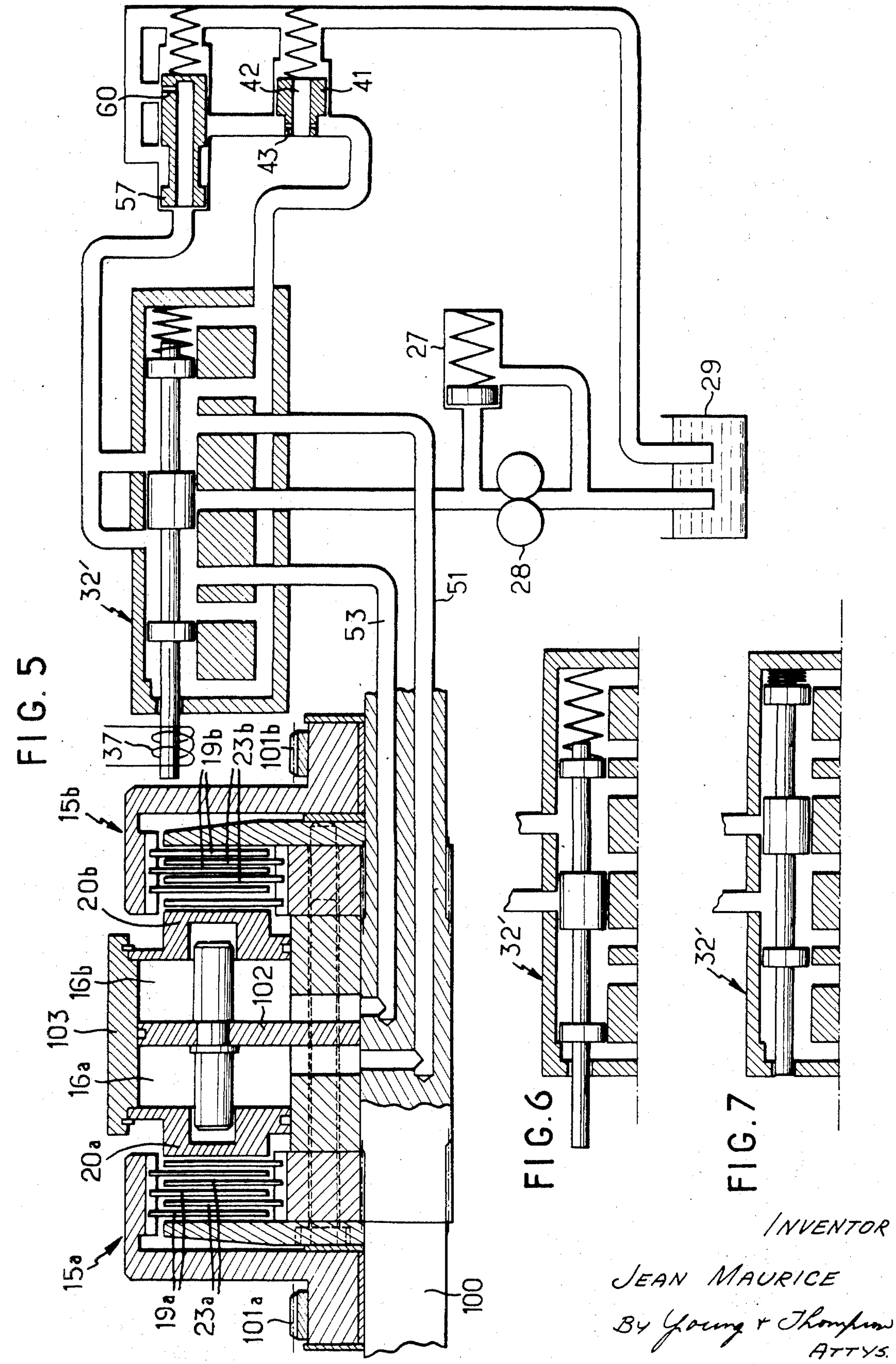
FIG. 5 is a view similar to FIG. 1, but relates to an alternative form in which the transmission comprises two clutches, the two clutches being both shown in the disengaged position.
FIG. 6 is a partial view of this alternative form, in which one of the clutches is engaged and the other disengaged.
FIG. 7 is also a partial view of the alternative form of construction, but in which it is the other clutch which is engaged while the first clutch is disengaged.

Reference will now be made to FIGS. 5 to 7, which relate to an alternative form in which the arrangement is similar to that which has just been described with reference to FIGS. 1 to 4, but in which the transmission comprises two clutches **15*a* and 15*b*, while the distributor, designated by 32′**, has three positions. The same reference numbers have been adopted in FIGS. 5 to 7 and in FIGS. 1 to 4 to designate similar elements.

The clutch **15*a* is of the multi-disc type and has a portion 19*a* of the clamping members which is driving and is fast for rotation with a shaft 100 which is coupled to the engine through the intermediary of a hydro-kinetic device such as the hydraulic torque converter 14 of FIG. 1. The other portion 23*a* of the clamping members of the clutch 15*a* is driven and is fast for rotation with an output 101*a***, formed for example by a toothed wheel.

The other clutch **15*b* is also of the multi-disc type and has its driving portion 19*b* of the clamping members which is fast for rotation with the shaft 100, while the driven portion 23*b* is fast for rotation with an output 101*b*, formed for example by a toothed wheel, distinct from the output 101*a***.

Two hydraulic chambers **16*a* and 16*b* varying in volume is reverse directions, are associated with the clutches 15*a* and 15*b*. The chamber 16*a* is an actuating chamber for the clutch 15*a* and a drainage chamber for the clutch 15*b*. The chamber 16*b* is an actuating chamber for the clutch 16*b* and a drainage chamber for the clutch 15*a***.

The chambers **16*a* and 16*b* are defined by a central partition 102 which is rigidly fixed to the shaft 100, and by a bell 103 which is fixed for rotation to the partition 102 while being axially displaceable with respect to this partition, and in which the end faces 20*a* and 20*b*** play the part of pressure plates for the two clutches.

The chambers **16*a* and 16*b* are connected by the conduits 51 and 53 to the distributor 32′**, which is of the three-position type:

A position of engagement of the clutch **15*a* and disengagement of the clutch 15*b*** (FIG. 6);

A neutral position in which the two clutches **15*a* and 15*b*** are disengaged (FIG. 5);

A position of disengagement of the clutch **15*a* and engagement of the clutch 15*b*** (FIG. 7).

The arrangement is furthermore similar to that which has been described with reference to FIGS. 1 to 4 and in particular there will be recognized at 28 the pump with the discharge valve 27 and the tank 29, at 60 the pressure-reducing means consisting of a small leakage passage, at 43 the return-throttling means associated with the calibrated clapper-valve 41 having a wide passage 42, and at 57 the control slide-valve which is subjected to the pressure of the pump 28 and which co-operates with the means 60 and 43 in such manner as to render the said means operative when the engine is rotating at idling speed and to render the said means inoperative when the engine is rotating faster than at idling speed.

It will be observed that in the neutral position of the distributor 32′ (FIG. 5), the slide-valve 57 is not subjected to the pressure of the pump 28 and is therefore put out of use.

What I claim is:

1. A transmission, especially for automobile vehicles, comprising at least one clutch having members adapted to be coupled by clamping together friction surfaces and in which one part is a driving portion associated with an engine having a variable speed of rotation including an idling speed while another part is a driven portion, said members being clamped together axially by an increase in volume of a hydraulic actuating chamber and by a reduction in volume of a hydraulic drainage chamber and being axially released by the reverse operation, conduits respectively connected to the two said chambers, distributor means associated with a source of fluid pressure and with a tank, said distributor means ensuring, according to its position, either the application of pressure to the conduit of said actuating chamber and the connection to the tank of the conduit of said drainage chamber for the purpose of engaging the clutch, or the connection to the tank of the actuating chamber and the application of pressure to the conduit of the drainage chamber for the purpose of disengaging the clutch, said transmission being characterized in that it comprises means for reducing the pressure in the actuating chamber of the clutch, means for throttling the return to the tank from the drainage chamber of the clutch, a control side-valve which is controlled in dependence on the speed of rotation of the engine and which co-operates with both of the two said means in such manner as to occupy, when the engine rotates at idling speed, a first position in which it renders the two said means operative and to occupy, when the engine rotates faster than idling speed, a second position in which it renders the two said means inoperative.

2. A transmission as claimed in claim 1, in which said source of pressure is a pump driven at a speed equal to or proportional to that of the engine so as to supply a lower pressure when the engine rotates at idling speed than when the engine rotates faster than idling speed, and in which said slide-valve is subjected to the pressure of said pump and is displaceable in response to the variations of said pressure.

3. A transmission as claimed in claim 1, in which said pressure-reducing means consists of a small leakage passage which is associated with said slide-valve and which is interposed between the actuating chamber and the tank, said slide-valve opening said leakage passage in the first position and closing said leakage passage in the second position.

4. A transmission as claimed in claim 1, in which said throttling means consists of a small hole which is interposed on the return to the tank of said drainage chamber in parallel with a wide return conduit, said latter conduit being closed by the slide-valve in the first position so as to render the small hole alone capable of evacuating the drainage chamber, while said wide conduit is opened by said slide-valve in the second position so as to permit a large evacuation rendering the small hole without effect.

5. A transmission as claimed in claim 4, in which said small hole is associated with a calibrated clapper-valve arranged so as to open a wide passage to the return to the tank of said drainage chamber when the members of the clutch carry out an approach movement prior to engagement and then to close said wide passage leaving the small hole alone capable of evacuating said drainage chamber when said approach movement has ceased and the clutch is fully engaged.

6. A transmission as claimed in claim 5, in which said calibrated clapper-valve is subjected to the return pressure of the conduit from the drainage chamber and is displaceable in response to the variations of the said pressure.

7. A transmission as claimed in claim 1, in which the driving portion of said clutch is driven from the engine through the intermediary of a coupling device in which the transmissible torque varies as a function of the speed of rotation of the engine and which comprises at least one element which, during the disengagement of said clutch, is capable of having a free inertia, and in which the driven portion of said clutch is coupled to a gear-box.

8. A transmission as claimed in claim 1, said transmission further comprising a single clutch, said distributor means having two positions corresponding respectively to the engagement and the disengagement of said clutch, said slide-valve being put out of action in the position of disengagement of said distributor means.

9. A transmission as claimed in claim 1, said transmission comprising two clutches, the actuating chamber of one clutch forming the draining chamber of the other clutch and vice-versa, the driving portions of the two clutches being fixed together, the clutches having separate driven portions, the distributor means having three positions corresponding respectively: to the engagement of the clutch and the disengagement of the other clutch; to a neutral position in which the two clutches are disengaged; and to a disengagement of one clutch and the engagement of the other clutch; said slide-valve being put out of action in the neutral position of said distributor means.

References Cited

UNITED STATES PATENTS

| | | | |
|---|---|---|---|
| 918,652 | 4/1909 | Bryan. | |
| 2,550,373 | 4/1951 | Ortloff et al. | 192—86 |
| 2,833,385 | 5/1958 | Peterson et al. | 192—86 XR |

BENJAMIN W. WYCHE III, Primary Examiner

U.S. Cl. X.R.

192—87.19, 103, 109; 137—625.69